United States Patent Office 2,962,292
Patented Nov. 29, 1960

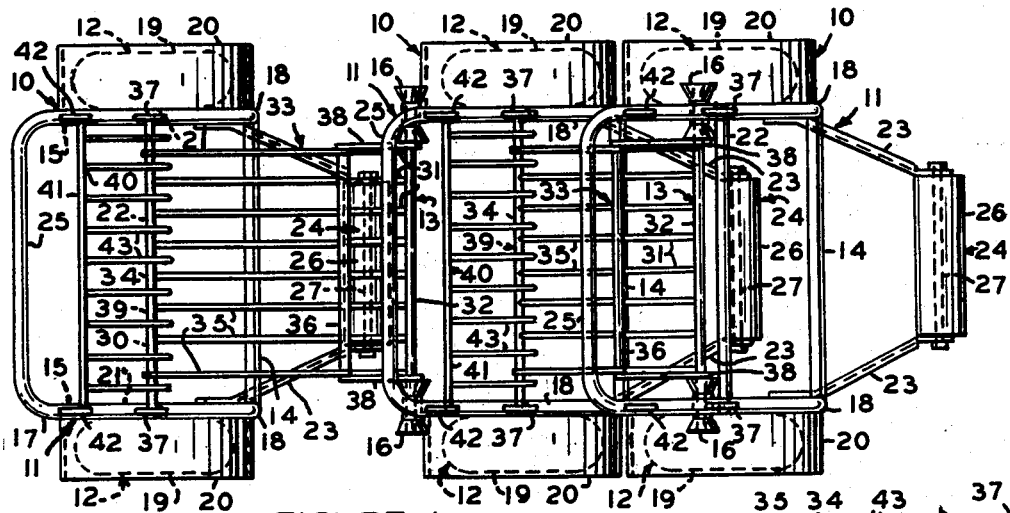

2,962,292

YARD CARRIAGE

William H. Edmonston, 1536 Poplar,
Kansas City 27, Kans.

Filed Mar. 24, 1959, Ser. No. 801,546

8 Claims. (Cl. 280—33.99)

This invention relates to an improved yard carriage for primary outdoor use to cart boxes, cartons and packages over sidewalks, curbs, gutters and rough yards from a delivery truck to and within a store building, the major feature being in a horizontal or inclined article supporting shelf being located forwardly from a transverse supporting frame, the rear portion of the shelf being pivoted to the supporting frame, the forward portion of the shelf having rollers pivoted thereto and adapted to track and follow upwardly on a like carriage having a rear curvature in an upright plane of the transverse supporting frame to automatically fold the shelf toward the transverse supporting frame when one carriage is manually aligned and pushed against a like carriage to save floor space when not in use. This yard carriage is also used for carting groceries from the store to a customer's car.

I have conceived and built a carriage with the frame and shelves made from high tensile steel and the surface plastic coated for rough everyday usage and all weather conditions. Pneumatic tired wheels of the yard carriage are sufficiently large to roll over rough yards, sidewalks, curbs and gutters. A forward supporting wheel or roller spaced from the rear wheels is sufficiently wide to span ordinary holes and recesses in the pavement, yard and gutters. I have provided fenders over the wheels to prevent soiling the boxes, cartons and packages when located on the shelves and carted over wet surfaces.

An object of the present invention is to provide a carriage having a transverse frame supported on wheels with a forward article supporting shelf pivoted thereto and extended forwardly therefrom, rollers rotatably mounted on the forward portion of the shelf, the transverse frame being sufficiently curved rearwardly in an upright plane near the lower portion thereof and adapted to align a like carriage with the rollers thereof to automatically track and fold the shelf thereof upwardly toward the transverse frame when one carriage is manually aligned and pushed against a like carriage to save floor space until desired for further use.

A further object of the invention is to space a similar shelf above the shelf mentioned in the preceding paragraph and operate it with connecting rods.

Another object of the present invention is to provide a yard carriage with pneumatic rear carriage supporting wheels sufficiently large and adapted to be rolled over rough yards, curbs and gutters.

Another object of the present invention is to provide a yard carriage with a wheel or roller, having a tread width equal to a major width portion of the carriage frame, spaced forwardly from the rear carriage supporting wheels and adapted to span holes and recesses in a yard, curb or gutter.

With these objects in view the invention will be further understood from the accompanying drawings, this specification and the scope of the appended claims.

In the drawings:

Figure 1 is an illustrated plan view of the improved yard carriages arranged in a tandem row. The first carriage is shown with the article supporting shelves projected forwardly for use, and the rollers are rotatably mounted thereon and aligned to track on the rear curvature of a like carriage frame. The second like carriage is illustrated with the shelves folded upwardly and toward the frame thereof with the rollers having tracked or followed the curvature of a third like frame. The third like frame is illustrated in fragmentary portion to save illustration and to show the forward carriage supporting wheel or roller with a sufficiently wide tread to span holes and recesses.

Figure 2 is an illustrated view in longitudinal elevation of Figure 1.

Figure 3 is a sectional view taken on lines 3—3 of Figure 2 illustrating the axle, wheels and fragments of the frame.

Figure 4 is a sectional view taken on lines 4—4 of Figure 2 illustrating essential fragments of the rear guards, connected to portions of the frame.

Figure 5 is a fragmentary view illustrated in perspective form showing the fender guard plate with a portion of the tubular frame secured thereto, supported on a portion of the axle, a portion of the lower shelf pivoted in the plate, and one of the forwardly extended members 23 secured to the side of the plate. A stop member 14 for normally holding the supporting shelf 13 in a forwardly extended position. This view is also representative of the opposite side of the carriage in reverse form of illustration.

Broadly the yard carriage 10 comprises: a transverse frame 11, carriage supporting wheels 12 mounted on said transverse frame 11, an article supporting shelf 13 having the rear end thereof pivoted at 30 and extending forwardly from the transverse frame 11 for normal support of the shelf 13, the transverse frame 11 being sufficiently curved downwardly and rearwardly at the lower portion 15, one or more rollers 16 being rotatably mounted on the forward portion of the shelf 13 adapted to be aligned and rolled upwardly on the rear curvature portion 15 of a like transverse frame 11 to automatically fold the shelf 13 toward the transverse frame 11 when one carriage 10 is normally aligned and manually pushed against a like carriage 10 to save floor space until desired for further use.

The transverse frame 11 more specifically comprises: An inverted U shape tube 17 disposed transversely to the line of travel of the yard carriage 10 and has downwardly and rearwardly curved portions 15 on the lower and opposite sides thereof. Arched tubular portions 18 branching forwardly in the same vertical plane from the curved tubular portions 15 are sufficiently spaced from the pneumatic tires 19 to rigidly support the fenders 20 spaced over the pneumatic tires 19. A transverse member 14 has the ends thereof secured to the forward portions of the arched tubular portions 18 to support the shelf 13 in a normal article supporting position. Plates 21 are disposed uprightly and are rigidly secured to and located below the upper portions of the curved tubular portions 15 and 18. The plates 21 are supported by an axle 22. Forwardly, downwardly, and inclined inwardly are extended members 23 which have the rear portions thereof secured to the plates 21, and space the forward carriage supporting wheel or roller 24 for forward support of the yard carriage 10. The top cross portion 25 of the inverted U shape tube 17 serves as a handle.

The forward carriage supporting wheel or roller 24 has a wide tread 26 equal to a major portion of the width of the tubular U shape frame 17 and is adapted to span recesses in the yard or pavement, and has an axle 27 preferably rotatable in the forward portion of extended member 23. The supporting wheel or roller 24 is sufficiently small in diameter and width to pass under the axle 22 of a like carriage and between the pneumatic tires 19.

The axle 22 has the opposite end portions 28 thereof extended through the plates 21 sufficiently to be supported by the wheels 29 with pneumatic tires 19.

The shelf 13 is of planar welded construction comprising: a rear transverse shaft 30, and longitudinal parallel spaced bars 31 spacing forwardly transverse shaft 32. The end portions of rear shaft 30 are pivoted in the plates 21 of the frame 11. The forward shaft 32 is projected transversely beyond the bars 31 sufficiently to receive rotatable rollers 16. The rollers 16 are flanged or spool shape adapted to track on curve portions 15 of tube 17.

A similar type shelf 33 of planar welded construction is spaced above the shelf 13 and comprises: rear shaft 34, and longitudinal parallel spaced bars 35 spacing forwardly transverse bar 36. The rear shaft 34 is pivoted in lugs 37 secured to the front portions of tube 17 and the forwardly transverse bar 36 is pivoted in the upper end portions of connecting rods 38. The lower end portions of the connecting rods 38 are pivoted on the transverse shaft 32. The connecting rods 38 are of sufficient length and the upper shelf 33 is sufficiently shorter than the lower shelf 13 to proportion them to raise together with shelf 13 and remain clear of the next like carriage frame 11 with only the rollers 16 tracking on the like frame 11 as illustrated in Figures 1 and 2.

The rear guards 39 and 40 respectively are of planar construction and disposed transversely at the rear of the shelves 13 and 33.

The rear guard 40 has a transverse rod 41 pivoted in lugs 42, spaced rods 43, having the upper ends thereof secured to rod 41, and depending slightly below shelf 33. The lower end portions of the rods 43 normally rest against the front of shaft 34. Lugs 42 are secured to the front of the tube 17.

The rear guard 39 has a transverse rod 44 pivoted in lugs 37, spaced rods 45, having the upper ends thereof secured to rod 44, and depending slightly below shaft 30. The lower end portions of the rods 45 normally rest against the front of the shaft 30.

I claim:

1. A yard carriage comprising: a transverse frame, carriage supporting wheels mounted on said transverse frame, an article supporting shelf having one end thereof pivoted to and extended forwardly from said transverse frame, a member secured to said transverse frame adapted to normally support said article supporting shelf in a position slightly inclined upwardly and forwardly from the horizontal, said frame being curved rearwardly in an upright plane near the lower portion thereof, a roller, said roller being rotatable on the forward portion of said shelf and adapted to be manually aligned and rolled upwardly on the rear curvature of a like transverse frame to automatically fold the said first toward said transverse frame when one carriage is manually aligned and pushed against a like carriage in tandem to save floor space until desired for further use.

2. A yard carriage comprising: a frame disposed transversely to a line of travel of the carriage, carriage supporting wheels rotatably mounted on said frame, an article supporting shelf having one end thereof pivoted to and extended forwardly from said frame, a member secured to said frame adapted to normally support said article supporting shelf in a forward position, said frame being curved rearwardly in an upright plane near the lower portion thereof, rollers, said rollers being rotatably mounted on the forward portion of said shelf and adapted to be aligned and rolled upwardly on the rear curvature of a like frame to automatically fold the said shelf toward the frame when the yard carriage is manually aligned and pushed against a like carriage in tandem to save floor space until desired for further use.

3. A yard carriage as claimed in claim 2: a pair of fenders, and said pair of fenders being secured to said frame located over a rear pair of said carriage supporting wheels and adapted to protect packages from water and mud thrown upwardly by the carriage supporting wheels.

4. A yard carriage as claimed in claim 2: a second shelf spaced above said first mentioned shelf and pivoted to said frame, connecting rods, said connecting rods connecting the said shelves forwardly in spaced relation and adapted to fold the second mentioned shelf with the first mentioned shelf toward the said frame.

5. A yard carriage comprising: a frame disposed transversely to the line of travel of the carriage; sufficiently large pneumatic carriage supporting wheels mounted on said frame adapted to roll over rough yards, gutters and curbs; an article supporting shelf having one end thereof pivoted to and extended forwardly from said frame, a stop member secured to said frame adapted to normally support said article supporting shelf in a position slightly inclined upwardly and forwardly from the horizontal and the said article supporting frame, said supporting frame being curved downwardly and rearwardly in a verticle plane near the lower portion thereof, rollers, said rollers being rotatably mounted on the forward portion of said shelf and adapted to be aligned and rolled upwardly on the rear curvature of a like frame to automatically fold the said shelf toward said frame when one like carriage is manually aligned in tandem and pushed against a like carriage to save floor space when not used.

6. A yard carriage as claimed in claim 5, a forward wheel or roller, said forward wheel or roller being supported by said frame, said forward wheel or roller having a tread width equivalent to a major width portion of said frame adapted to roll over recesses and holes in a yard or pavement, the forward wheel or roller being sufficiently small in diameter to pass below the axle of a like carriage supporting the rear wheels thereof.

7. A yard carriage comprising: a frame disposed transversely to the line of travel of the carriage, a transverse rear axle, large supporting wheels mounted on said rear axle, a forward transverse supporting roller, a pair of forwardly extended members, said roller being mounted in and between the front portions of said pair of forwardly extended members, the rear portion of said pair of forwardly extended members being secured to said frame, said roller having a major width of said frame, said forwardly extended members being inclined forwardly and downwardly and inwardly to said roller, said roller being sufficiently small in diameter and width adapted to pass under the axle of a like carriage and between the large supporting wheels of the like carriage, an article supporting shelf having one end thereof pivoted to and extended forwardly from said frame, a stop member secured to said frame adapted to normally support said article supporting shelf in a forwardly position, rollers, said rollers being pivoted to the forward portion of said shelf, said supporting frame being sufficiently curved rearwardly in a vertical plane near the lower portion thereof and adapted to be aligned with the rollers of a like carriage and rolled upwardly on the rear curvature of said frame to automatically fold the shelf of a like carriage toward the frame thereof when one like carriage is manually aligned and pushed against the carriage in tandem form to save floor space when not used.

8. A carriage comprising: a transverse frame, the lower portion of said transverse frame having a rear curvature in an upright plane, carriage supporting wheels mounted on said transverse frame, said transverse frame having spaced sides extended forwardly from the lower portion of said transverse frame, an article supporting shelf having one end thereof pivoted to and extended forwardly from the spaced sides of said transverse frame, a member secured to the spaced sides of said transverse frame adapted to normally support said article supporting shelf in a forwardly extended position, a roller, said roller being rotatable on the forward portion of said supporting shelf and adapted to be manually aligned and rolled upwardly on the rear curvature of a like transverse frame to automatically fold the said supporting shelf toward said transverse frame when one carriage is manually aligned and pushed against a like carriage in tandem to save floor space until desired for further use.

References Cited in the file of this patent

UNITED STATES PATENTS

| | | |
|---|---|---|
| 2,314,659 | Peterson | Mar. 23, 1943 |
| 2,738,201 | Spears | Mar. 13, 1956 |
| 2,786,692 | Timpson | Mar. 26, 1957 |